March 16, 1937. E. J. REH 2,074,072
OPHTHALMIC LENS AND METHOD OF MAKING SAME
Filed Feb. 1, 1935
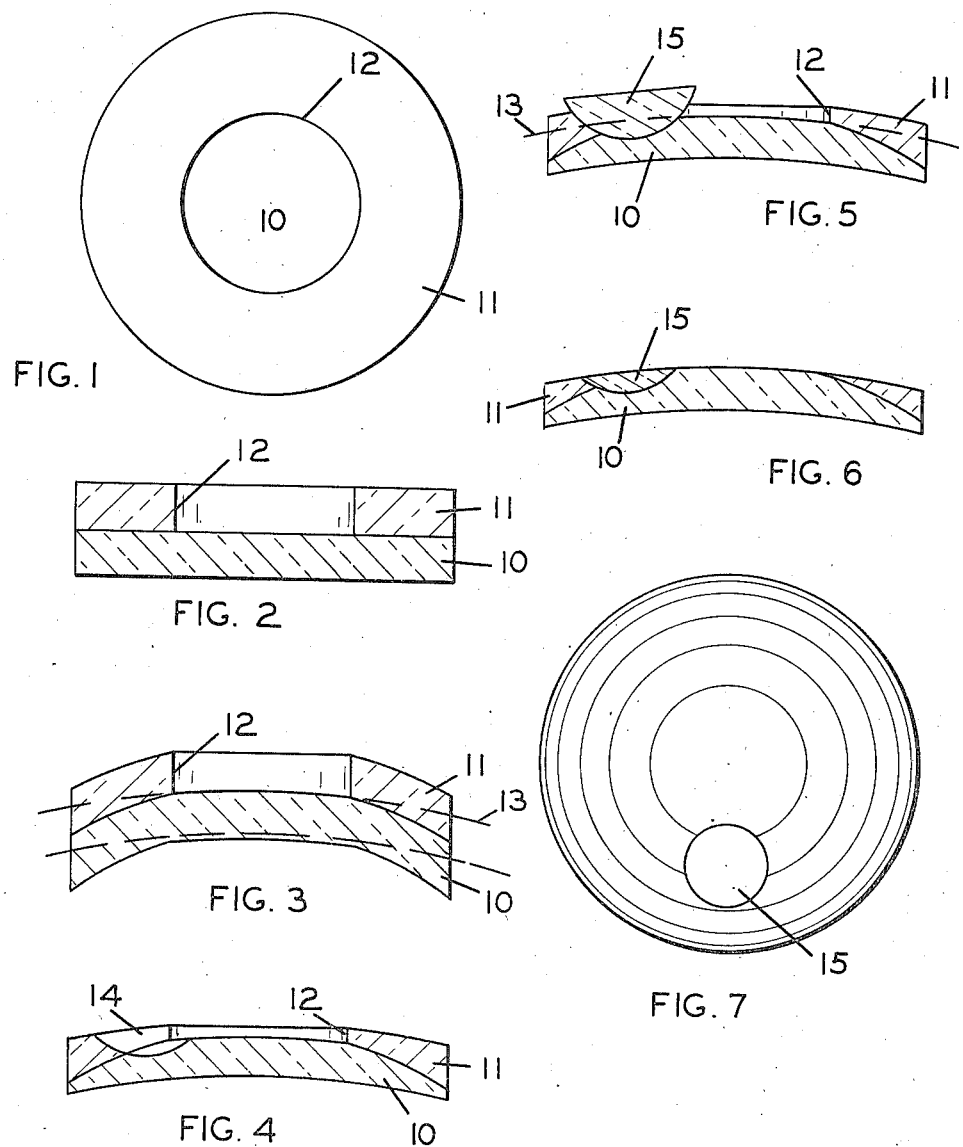
EDWARD J. REH
INVENTOR
BY
ATTORNEY Patented Mar. 16, 1937

2,074,072

UNITED STATES PATENT OFFICE 2,074,072

OPHTHALMIC LENS AND METHOD OF MAKING SAME

Edward J. Reh, Rochester, N. Y., assignor to Bausch & Lomb Optical Company, Rochester, N. Y., a corporation of New York Application February 1, 1935, Serial No. 4,540

6 Claims. (Cl. 88—54)

The present invention relates to ophthalmic lenses and more particularly to ophthalmic lenses having a clear central portion and a colored peripheral zone. In such a type of lens the colored peripheral zone may be provided by an annular colored member of glass secured to a clear glass member.

One of the objects of my invention is to provide an improved method of making ophthalmic lenses having a clear central portion and a colored peripheral zone. Another object is to provide a method of making multifocal ophthalmic lenses having a clear central portion and a colored peripheral zone in which the annular colored member and the segment are both on the convex side of the lens. A further object is to provide means whereby the size of the central portion of such a lens can be readily controlled in manufacture. A further object is to provide a new and improved lens blank to be used in the manufacture of lenses of the type described. These and other objects and advantages reside in certain novel features of construction, arrangement and combination of parts and in the steps and processes as will hereinafter be more fully set forth and pointed out in the appended claims.

Figs. 1 and 2 show plan and sectional views, respectively, of an annular colored glass member secured to a clear glass member.

Fig. 3 is a sectional view of same after being molded or pressed to a concavo-convex form.

Fig. 4 is a sectional view of the blank of Fig. 3 after the colored face has been partly ground away and provided with a countersink.

Fig. 5 is a sectional view showing a segment in the countersink of the blank shown in Fig. 4.

Figs. 6 and 7 show sectional and plan views, respectively, of the finished lens.

Ophthalmic lenses having a clear central portion and a colored peripheral zone have been made by securing a colored glass blank to a clear glass blank and grinding away the central portion of the colored blank. In order to make the size of the clear portion easy to control, the colored member is formed with a central aperture and the concave surface has heretofore been ground on the side of the annular colored blank. This surface must be spherical so that the color density will be uniform around the periphery of the lens and when a multifocal lens is being made in this way the segment is placed on the same side as the colored member so that it will be ground with a spherical surface. Segments placed on the concave side of the lens are impractical except for very weak additions and where strong additions are required are practically impossible.

These difficulties are solved in the present invention wherein 10 indicates a clear glass blank having a colored glass blank 11 permanently secured thereto as by fusing. The colored blank 11 has a centrally disposed aperture 12 of the same diameter as that desired for the clear portion of the finished lens. This composite member shown in Fig. 2, is then pressed or molded into the shape shown in Fig. 3. The central portion of the clear blank 10, within the area of the aperture 12, is pressed or molded to a shape approximately the final curvature desired, as indicated by the dotted line 13. The peripheral portions of the composite member, beyond the aperture 12, are given a curvature much more strongly convex than that of the line 13. Thus, when the composite member is ground to the curvature indicated by the line 13, until the wall bounding the aperture 12 just disappears, there will be a peripheral colored ring of gradually increasing density surrounding the central clear portion.

However, before the wall bounding the aperture 12 entirely disappears, a countersink 14 is formed in the composite member and a segment 15 is permanently secured in the countersink as by fusing. The grinding is then continued until the wall bounding the aperture 12 has just disappeared and the convex face of the lens is finished as indicated in Figs. 6 and 7. Any desired prism or cylinder component can then be ground on the concave side to suit the individual prescription.

While I have shown and described the preferred embodiment of my invention, it is obvious that the two blanks 10 and 11 could be separately formed to the shapes indicated in Fig. 3 before the composite member is assembled. Furthermore, the clear glass blank could be formed with a single curvature rather than the two curvatures shown. By not completely grinding away the wall bounding the aperture 12 before the segment 15 is secured in the countersink 14 the danger of grinding away too much of the colored glass when grinding off the segment, is largely eliminated.

From the foregoing, it is apparent that I am able to attain the objects of my invention and provide a new and improved method of making multifocal ophthalmic lenses having a clear central portion and a colored peripheral zone and also provide a new lens blank for use in making such lenses. Various modifications can, of course, be made without departing from the spirit of my invention or the scope of the appended claims.

I claim:

1. The method of making ophthalmic lenses which comprises forming a central aperture in a blank of colored glass, securing said blank to a piece of clear glass in superposed relation, pressing said composite blank to a deep meniscus form with the apertured blank on the convex side, forming a countersink in said convex side, securing a clear segment in said countersink and using the aperture as a guide while grinding the convex face of said blank to its final curve.

2. A concavo convex ophthalmic lens blank comprising a curved glass layer forming the concave face and a coextensive curved colored glass layer forming the convex face, said colored glass layer having a centrally disposed aperture therethrough, the radius of curvature of the convex side of said glass layer being less at its edges than it is opposite said aperture.

3. A concavo convex ophthalmic lens blank comprising two substantially coextensive sheets of glass, the glass on the convex side of said blank being colored and being provided with a centrally disposed aperture therethrough, said blank beyond said aperture being formed with a radius of curvature much less than the final radius of curvature intended for the lens, the glass on the concave side being clear and having at the portion opposite said aperture a radius of curvature approaching the final radius of curvature intended for the lens.

4. The method of making ophthalmic lenses having a clear central portion and a colored peripheral zone, which comprises forming a blank of glass into a concavo convex shape having a central zone of one radius of curvature and a peripheral zone of a less radius of curvature, forming a concavo convex blank of colored glass with a centrally disposed aperture therethrough of the same size as said central zone, securing the concavo face of said colored glass to the convex face of said glass in superposed relation with said aperture in alignment with said central zone forming a counter-sink in the convex side of the composite blank so formed, securing a clear segment in said counter-sink and using the aperture as a guide while grinding the convex face of said blank to its final curve.

5. The method of making curved ophthalmic lenses which comprises forming a centrally disposed aperture in a blank of colored glass, securing said blank to a continuous blank of clear glass in superposed relation thereto, pressing the composite member into a concavo convex form having a radius of curvature less than that desired for the final lens with the colored member on the convex side of the composite member, pressing the central portion of said clear glass to a curvature approximating that desired for the final lens, and using said aperture as a guide while grinding away the colored glass.

6. The method of making an ophthalmic lens which comprises fusing together two substantially coextensive pieces of glass of different light transmission to form a composite member, forming the composite member into a concavo convex blank having its central zone of one radius of curvature and its peripheral zone of a less radius of curvature of the same sign and having the piece of glass of lower transmission on the convex side, and forming on the convex side of said blank a finished surface of a radius of curvature substantially equal to the first-mentioned radius of curvature.

EDWARD J. REH.